United States Patent [19]

Chen

[11] Patent Number: 5,329,291
[45] Date of Patent: Jul. 12, 1994

[54] CATHODE RAY TUBE OPTICAL FILTER DEVICE WITH CURSOR POINTING FUNCTION

[75] Inventor: Ming-Der Chen, Tainan Hsien, Taiwan

[73] Assignee: Liang Ying Co., Ltd., Tainan, Taiwan

[21] Appl. No.: 107,642

[22] Filed: Aug. 18, 1993

[51] Int. Cl.⁵ .................................................. G09G 1/00
[52] U.S. Cl. ..................................... 345/157; 348/835
[58] Field of Search ............... 345/180, 181, 182, 173, 345/172, 174, 175, 176, 157; 358/453, 245, 247, 250, 253

[56] References Cited

U.S. PATENT DOCUMENTS

| | | | |
|---|---|---|---|
| 4,017,848 | 4/1977 | Tannas, Jr. ......................... | 345/173 |
| 4,634,845 | 1/1987 | Hale et al. ......................... | 235/350 |
| 4,922,061 | 5/1990 | Meadows et al. ................. | 345/173 |

FOREIGN PATENT DOCUMENTS

| | | | |
|---|---|---|---|
| 3-68966A | 3/1991 | Japan ................................. | 345/157 |
| 436794A | 2/1992 | Japan ................................. | 345/157 |
| 09983 | 6/1992 | World Int. Prop. O. ........... | 345/157 |

*Primary Examiner*—Edward L. Coles, Sr.
*Assistant Examiner*—Jerome Grant, II
*Attorney, Agent, or Firm*—Oblon, Spivak, McClelland, Maier & Neustadt

[57] ABSTRACT

A crt optical filter device includes a transparent plastic sheet and a transparent glass panel, each of which is provided with a transparent conductive circuit layer and a pair of conductors. The outer surface of the glass panel is disposed adjacent to the inner surface of the transparent plastic sheet, while the inner surface thereof is to be disposed adjacent to a screen of a computer monitor. A plurality of spacers, which are made of an insulative material, normally space apart the conductive circuit layers of the transparent plastic sheet and the glass panel. An interface card is connected electrically to the conductors and is to be connected electrically to a computer. The interface card receives analog X and Y signals that correspond to a selected part of the transparent plastic sheet from the conductors when the conductive circuit layers are brought into electrical contact due to application of pressure on the selected part of the transparent plastic sheet. The interface card processes the analog X and Y signals into corresponding digital signals for controlling the computer to move a cursor on the screen of the computer monitor so as to coincide with the selected part of the transparent plastic sheet and for controlling the computer to accomplish predetermined functions.

3 Claims, 5 Drawing Sheets

CATHODE RAY TUBE OPTICAL FILTER DEVICE WITH CURSOR POINTING FUNCTION

BACKGROUND OF THE INVENTION

1. Field of the Invention

The invention relates to a cathode ray tube (crt) optical filter device, more particularly to a crt optical filter device with cursor pointing function.

2. Description of the Related Art

A crt optical filter is usually installed on a screen of a computer monitor in order to absorb partially the harmful electromagnetic radiation generated thereby. A separate cursor pointing device, such as a computer keyboard or a computer mouse, is installed to control the movement of a cursor on the screen.

The objective of the present invention is to provide a crt optical filter device with cursor pointing function.

SUMMARY OF THE INVENTION

Accordingly, a crt optical filter device of the present invention is to be installed on a computer monitor of a computer and is capable of controlling movement of a cursor on a screen of the computer monitor. The crt optical filter device comprises:

a transparent plastic sheet having an inner surface formed with a transparent first conductive circuit layer and a pair of first conductors; a transparent glass panel having an outer surface disposed adjacent to the inner surface of the transparent plastic sheet and an inner surface to be disposed adjacent to the screen of the computer monitor, the outer surface of the glass panel being provided with a transparent second conductive circuit layer, a pair of second conductors, and a grounded static conductor;

one of the inner surface of the transparent plastic sheet and the outer surface of the glass panel being further provided with a plurality of spacers which are made of an insulative material and which space apart the first and second conductive circuit layers; and an interface card connected electrically to the first and second conductors and to be connected electrically to the computer, the interface card receiving analog X and Y signals that correspond to a selected part of the transparent plastic sheet from the first and second conductors when a portion of the first conductive circuit layer contacts and connects electrically with a portion of the second conductive circuit layer due to application of pressure on the selected part of the transparent plastic sheet, the interface card processing the analog X and Y signals into corresponding digital signals for controlling the computer to move the cursor on the screen of the computer monitor so as to coincide with the selected part of the transparent plastic sheet and for controlling the computer to accomplish predetermined functions.

BRIEF DESCRIPTION OF THE DRAWINGS

Other features and advantages of the present invention will become apparent in the following detailed description of the preferred embodiments, with reference to the accompanying drawings, of which.

DETAILED DESCRIPTION OF THE PREFERRED EMBODIMENTS

Figure 1:
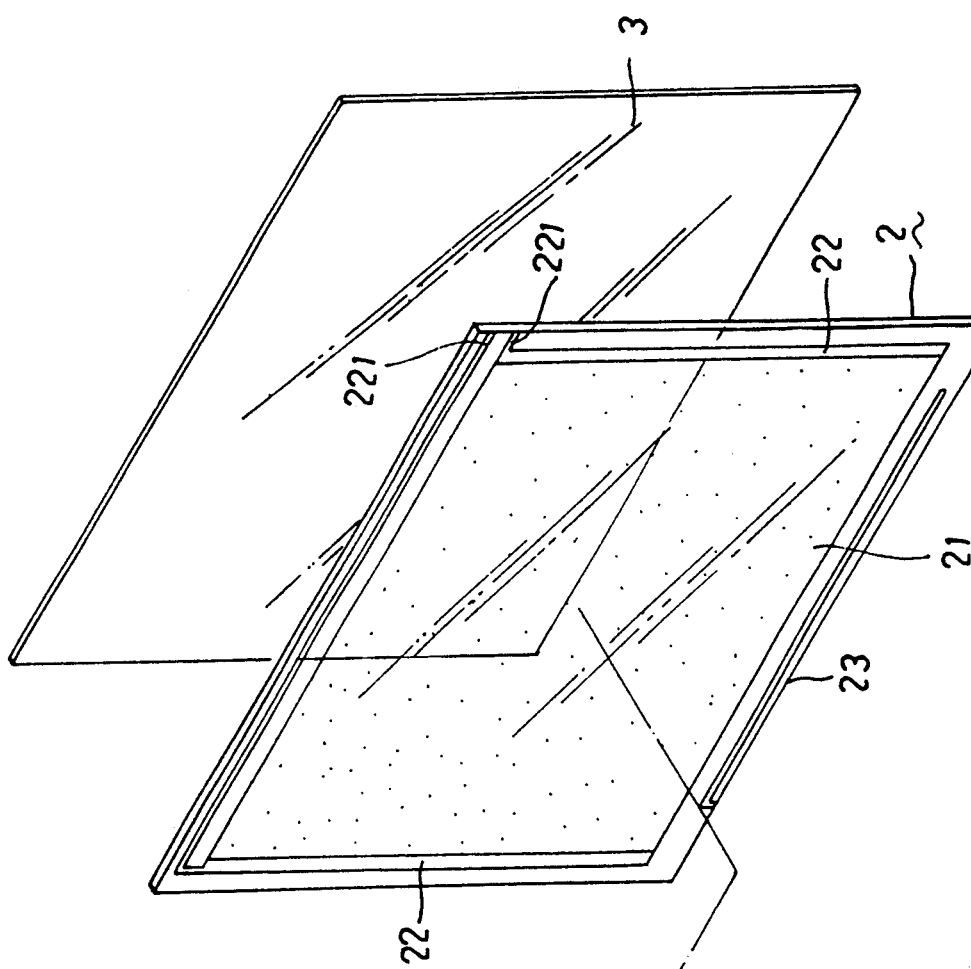
FIG. 1 is an exploded view of the first preferred embodiment of a crt optical filter device with cursor pointing function according to the present invention.
Figure 2:
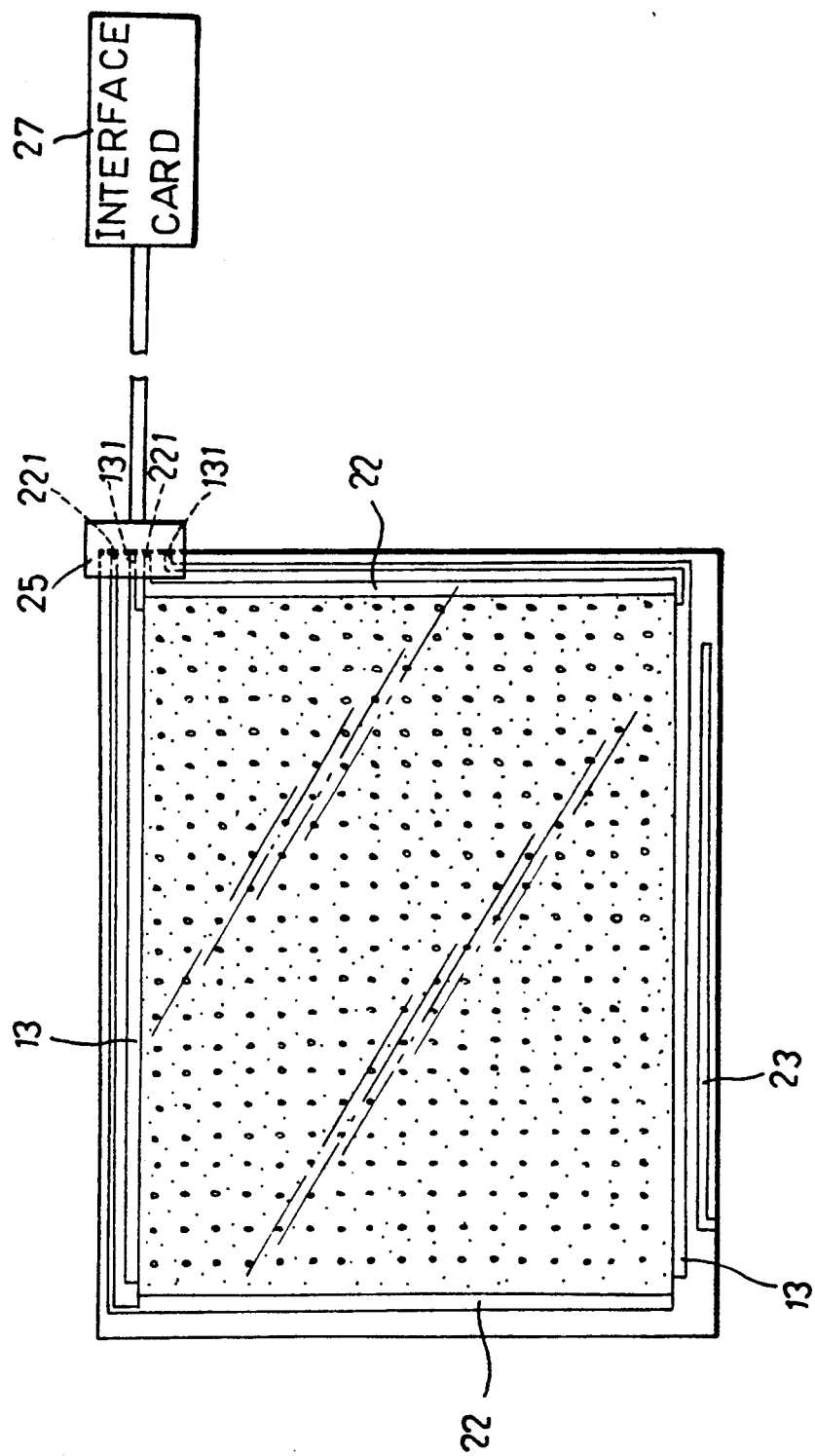
FIG. 2 is a front view of the first preferred embodiment.

Referring to FIGS. 1 and 2, the first preferred embodiment of a crt optical filter device according to the present invention is shown to comprise a transparent sheet 1, a transparent glass panel 2 and an optical filter film 3.

The transparent sheet 1 is a rectangular plastic sheet and has an inner surface which is formed with a first conductive circuit layer 11 on a rectangular region of the latter. The first conductive circuit layer 11 is made of a transparent conductor. The rectangular region on the inner surface of the transparent sheet 1 is further provided with a plurality of spacers 12 which are made of an insulative material. The inner surface of the transparent sheet 1 further has a pair of horizontal conductors 13 on two sides of the rectangular region. The horizontal conductors 13 are formed by conventional thin film technology. The conductors 13 have end portions 131 which extend to a corner of the transparent sheet 1.

The glass panel 2 is a rectangular glass piece which has an outer surface that is secured to the inner surface of the transparent sheet 1. The outer surface of the glass panel 2 is formed with a second conductive circuit layer 21. The second conductive circuit layer 21 is similarly made of a transparent conductor. The outer surface of the glass panel 2 is further formed with a pair of vertical conductors 22 adjacent to two vertical edges thereof. The vertical conductors 22 are similarly formed by conventional thin film technology. The conductors 22 have end portions 221 which extend to a corner of the glass panel 2. A static conductor 23, which is formed by conventional thin film technology, is formed adjacent to a bottom edge of the glass panel 2 and is grounded so as to minimize the presence of static electricity.

The optical filter film 3 is made of a transparent material and is capable of absorbing harmful electromagnetic radiation. The optical filter film 3 is secured on an inner surface of the glass panel 2.

Figure 3:
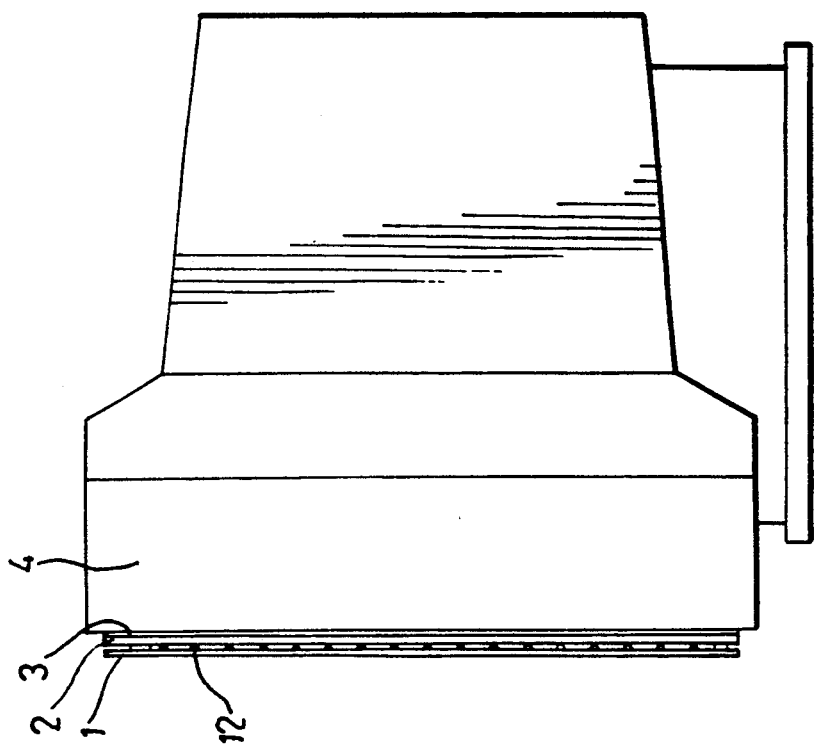
FIG. 3 is a side view which illustrates the first preferred embodiment when installed on a screen of a conventional computer monitor.

FIG. 2 shows the arrangement of the conductors 13, 22 and their end portions 131, 221, and the static conductor 23 after the first preferred embodiment has been assembled. Note that the end portions 131, 221 are disposed on the same corner of the optical filter device. FIG. 3 illustrates the first preferred embodiment when installed on a screen of a conventional computer monitor 4. The optical filter film 3 serves to absorb partially the harmful electromagnetic radiation that is generated by the computer monitor 4.

The spacers 12 on the transparent sheet 1 serve to space apart the first and second conductive circuit layers 11, 21 when the transparent sheet 1 is secured on the glass panel 2. When pressure is applied on a selected part of the transparent sheet 1, the selected part of the transparent sheet 1 is urged toward the glass panel 2 so that a portion of the first conductive circuit layer 11 contacts and connects electrically with a portion of the second conductive circuit layer 21, thereby enabling analog X and Y signals, which correspond to the location of the selected part of the transparent sheet 1, to be generated at the end portions 131, 221 of the conductors 13, 22. A connector 25 is mounted on the corner of the optical filter device to connect electrically the end portions 131, 221 of the conductors 13, 22 and an interface card 27. The interface card 27 is adapted to be mounted detachably to the expansion slot of a computer. The interface card 27 processes the analog X and Y signals from the conductors 13, 22 into corresponding digital signals for controlling the computer to move a cursor on the screen of the computer monitor so as to coincide with the selected part of the transparent sheet 1 that was pressed. This illustrates how the optical filter device of the present invention achieves its cursor pointing function.

Figure 4:
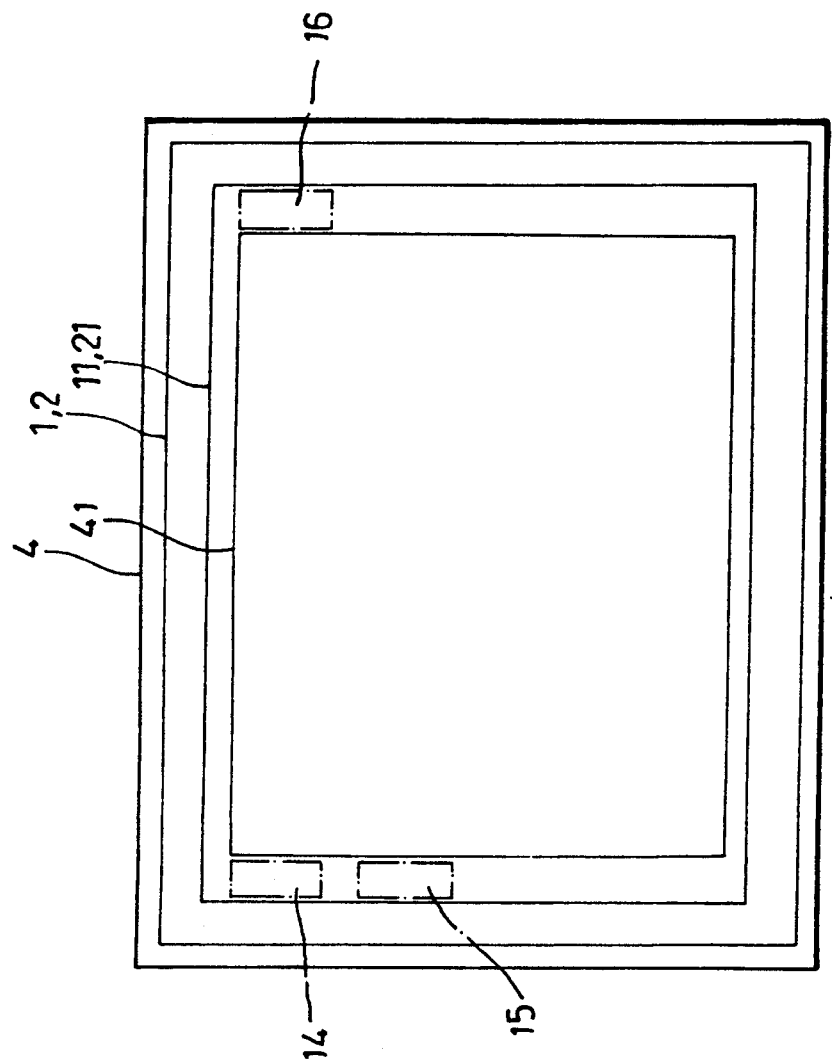
FIG. 4 is a front view of the first preferred embodiment when installed on the screen of the conventional computer monitor.

Referring to FIG. 4, the central rectangular region 41 on the screen of the computer monitor 4 corresponds to the area in which movement of the cursor is permitted. When a selected part of the transparent sheet 1 within the rectangular region 41 is pressed, the computer moves the cursor so as to coincide with the selected part of the transparent sheet 1. Therefore, there is no need to operate a computer keyboard so as to move the cursor to a desired position on the screen. Note that the first and second conductive circuit layers 11, 21 occupy an area which is larger than the rectangular region 41. The area surrounding the rectangular region 41 can be divided into several regions 14, 15, 16 which correspond to the function keys of a conventional cursor pointing device. For example, region 14 may correspond to a lock key, region 15 may correspond to a select key, while region 16 corresponds to an enter key. Since the regions 14, 15, 16 are outside the area in which movement of the cursor is permitted, the cursor does not move when the transparent sheet 1 is pressed at any one of the regions 14, 15, 16. Instead, the resulting analog X and Y signals are interpreted by the interface card 27 as function key signals and not as cursor location signals, thereby enabling the interface card 27 to control the computer to accomplish predetermined functions.

In this embodiment, an optical filter film 3 is secured on the inner surface of the glass panel 2. In actual practice, the optical filter film 3 is not required if a colored transparent glass panel is employed. Of course, absorption of harmful electromagnetic radiation is enhanced when the optical filter film 3 is employed.

Figure 5:
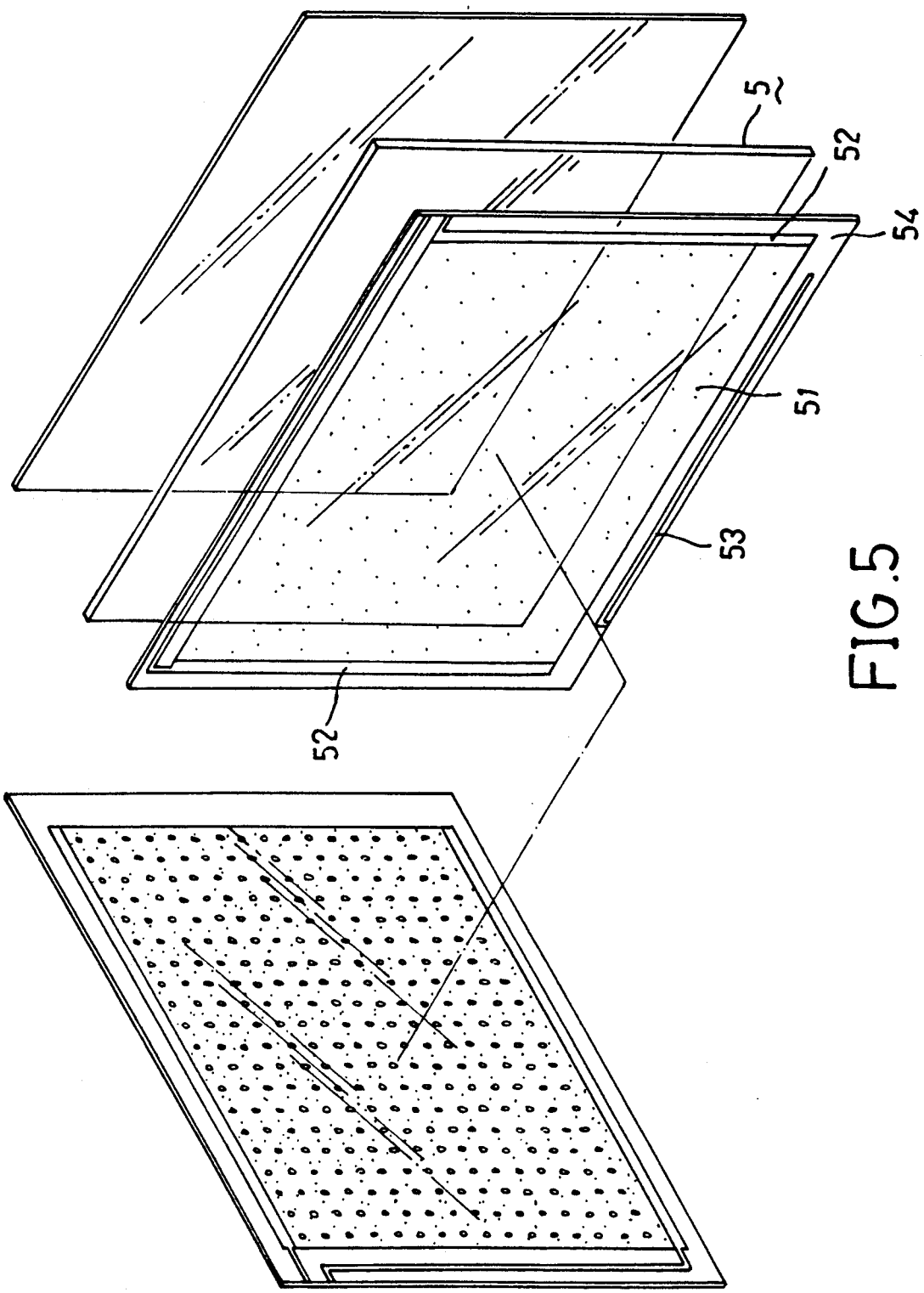
FIG. 5 is an exploded view of the second preferred embodiment of a crt optical filter device with cursor pointing function according to the present invention.

FIG. 5 is an exploded view of the second preferred embodiment of a crt optical filter device according to the present invention. The second conductive circuit layer 51, the vertical conductors 52 and the static conductor 53 are formed on a second transparent sheet 54 that is secured on the outer surface of the glass panel 5. The operation and general configuration of the second preferred embodiment are substantially similar to the first preferred embodiment and will not be detailed further.

While the present invention has been described in connection with what is considered the most practical and preferred embodiments, it is understood that this invention is not limited to the disclosed embodiments but is intended to cover various arrangements included within the spirit and scope of the broadest interpretation so as to encompass modifications and equivalent arrangements.

I claim:

1. A crt optical filter device to be installed on a computer monitor of a computer and capable of controlling movement of a cursor on a screen of the computer monitor, said crt optical filter device comprising:
    a first transparent plastic sheet having an inner surface formed with a transparent first conductive circuit layer and a pair of first conductors;
    a transparent glass panel having an outer surface disposed adjacent to said inner surface of said first transparent plastic sheet and an inner surface to be disposed adjacent to the screen of the computer monitor, said outer surface of said glass panel being provided with a transparent second conductive circuit layer, a pair of second conductors, and a grounded static conductor;
    one of said inner surface of said first transparent plastic sheet and said outer surface of said glass panel being further provided with a plurality of spacers which are made of an insulative material and which space apart said first and second conductive circuit layers; and
    an interface card connected electrically to said first and second conductors and to be connected electrically to the computer, said interface card receiving analog X and Y signals that correspond to a selected part of said first transparent plastic sheet from said first and second conductors when a portion of said first conductive circuit layer contacts and connects electrically with a portion of said second conductive circuit layer due to application of pressure on said selected part of said first transparent plastic sheet, said interface card processing said analog X and Y signals into corresponding digital signals for controlling the computer to move the cursor on the screen of the computer monitor so as to coincide with said selected part of said first transparent plastic sheet and for controlling the computer to accomplish predetermined functions.

2. The crt optical filter device as claimed in claim 1, wherein said inner surface of said glass panel is provided with a transparent optical filter film.

3. The crt optical filter device as claimed in claim 1, wherein said outer surface of said glass panel has a second transparent plastic sheet secured thereon, said second conductive circuit layer, said second conductors, and said static conductor being formed on said second transparent sheet.

* * * * *